United States Patent
Blatter et al.

[11] Patent Number: 6,112,544
[45] Date of Patent: Sep. 5, 2000

[54] GENERATOR COOLING SYSTEM

[75] Inventors: Richard Blatter, Ennetbaden; Philipp Elkuch, Zürich; Kurt Fischer, Mellingen, all of Switzerland; Erhard Liebig, Laufenburg, Germany

[73] Assignee: ABB Alstom Power (Switzerland) Ltd, Baden, Switzerland

[21] Appl. No.: 09/122,095

[22] Filed: Jul. 24, 1998

[30] Foreign Application Priority Data

Jul. 24, 1997 [DE] Germany .................... 197 31 852

[51] Int. Cl.$^7$ .............. F25D 17/02; F25B 27/00; F02C 7/12
[52] U.S. Cl. .......... 62/434; 62/238.6; 62/238.4; 62/259.2; 60/39.83; 60/730
[58] Field of Search .............. 62/259.2, 259.1, 62/331, 238.1, 238.6, 434, 238.4; 60/39.83, 728, 730, 655, 912; 976/DIG. 187

[56] References Cited

U.S. PATENT DOCUMENTS

| | | | |
|---|---|---|---|
| 3,974,642 | 8/1976 | Pacault | 60/39.182 |
| 4,212,168 | 7/1980 | Bouchard et al. | 60/661 |
| 4,347,705 | 9/1982 | Mirante | 60/651 |
| 4,576,005 | 3/1986 | Force | 60/618 |
| 5,097,669 | 3/1992 | Hargrove et al. | |
| 5,152,153 | 10/1992 | Hsiao | 62/260 |
| 5,607,013 | 3/1997 | Inoue et al. | 165/207 |

FOREIGN PATENT DOCUMENTS

148046   7/1977   United Kingdom .

*Primary Examiner*—William Doerrler
*Attorney, Agent, or Firm*—Burns, Doane, Swecker & Mathis, L.L.P.

[57] ABSTRACT

In a generator cooling system (10) for a generator used for current generation in a power station, said generator having a generator cooler (11) which is arranged, together with further coolers (12, . . . , 17), in a closed intermediate cooling circuit (18) which transfers heat to a main cooling water system via at least one intermediate cooler (19, 20), increased capability is achieved by providing, in the intermediate cooling circuit (18), means (32) which improve the transmission of heat from the generator cooler (11) into the main cooling water system.

19 Claims, 6 Drawing Sheets

GENERATOR COOLING SYSTEM

BACKGROUND OF THE INVENTION

1. Field of the Invention

The present invention relates to the field of power station technology. It refers to a generator cooling system for a generator used for current generation in a power station, said generator having a generator cooler which is arranged, together with further coolers, in a closed intermediate cooling circuit which transfers heat to a main cooling water system via at least one intermediate cooler.

2. Discussion of Background

Generators used for current generation in a power station have to be cooled in order to discharge the energy loss heat occurring during operation. In this case, a distinction is made, according to the cooling system, between open-cooled generators and closed-cooled generators. Open-cooled generators operate with air cooling. In closed-cooled generators, air cooling, hydrogen ($H_2$) cooling, water cooling or mixed cooling, in which the rotor is cooled by hydrogen and water and the stator by water, may be used.

For the maximum apparent power output which a generator can deliver depends heavily on the temperature of the components, that is to say on the temperature of the cooling medium. The lower the temperature of the heat sink, into which the energy loss heat is discharged, the higher the maximum operable apparent power output of the generator, or the longer the life of the generator in the case of a predetermined fixed apparent power output. If appropriate, it is then also possible to change over from complex costly generator cooling to simpler cheaper generator cooling, for example from hydrogen cooling to air cooling.

Figure 1:
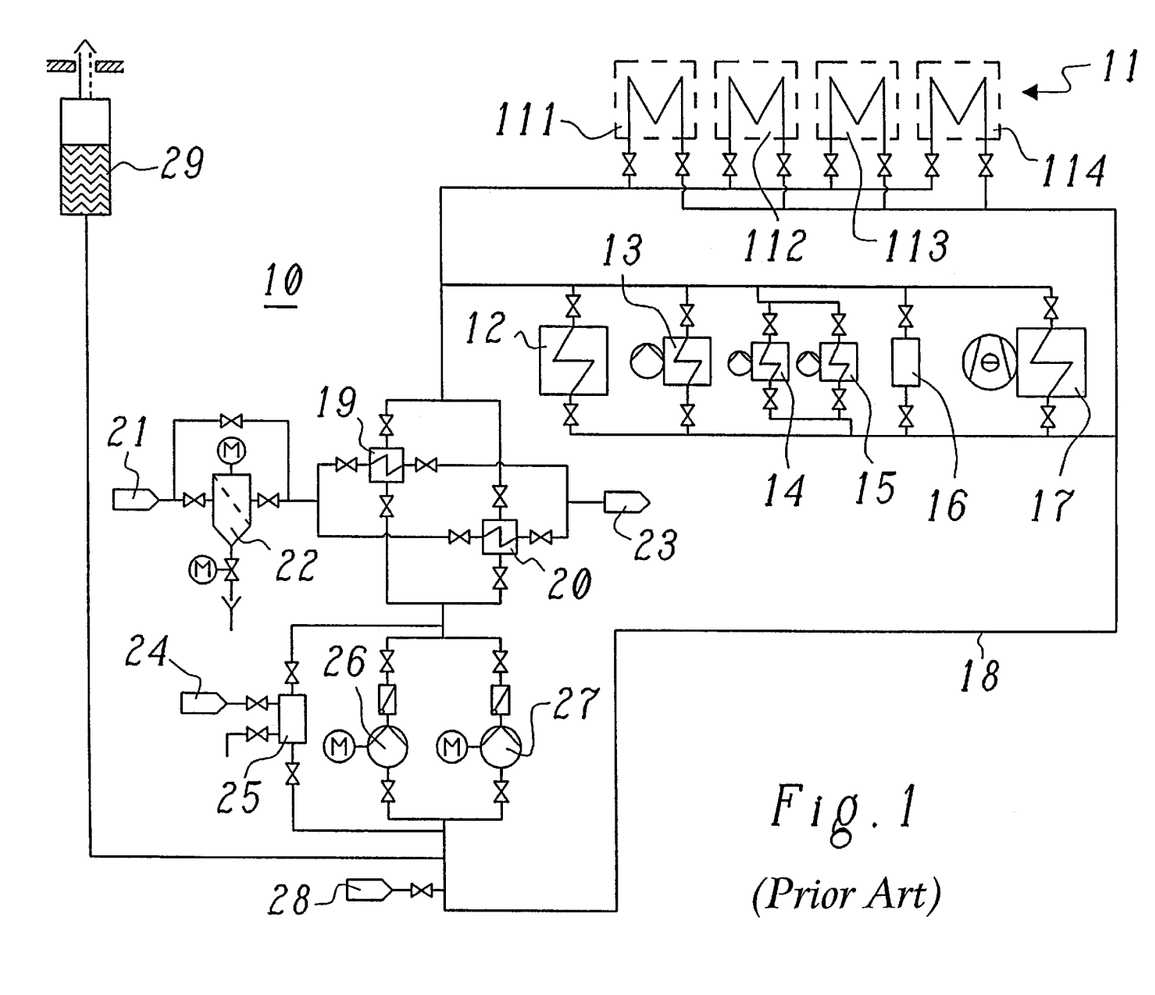
FIG. 1 shows the diagram of a closed intermediate cooling circuit of a generator cooling system according to the prior art.

An example of a known generator cooling system is illustrated in FIG. 1. The generator cooling system 10 comprises a closed intermediate cooling circuit 18, in which a cooling medium, usually water, circulates. Connected in parallel in the intermediate cooling circuit 18 are a generator cooler 11 with a plurality of individual coolers 111 to 114 and, as further coolers, for example an oil cooler 12, a boiler pump cooler 13, two feed water pump coolers 14 and 15, a sampling cooler 16 and a fuel gas compressor cooler 17. The cooling water is pumped through the intermediate cooling circuit 18 by two cooling water pumps 26 and 27 working in parallel. It flows through two arranged in parallel, intermediate coolers 19 and 20, through which the main cooling water of the main cooling water system (34 in FIG. 6) flows. The main cooling water system is not illustrated in FIG. 1. The connection to this system is symbolized by an inlet 21 and an outlet 23 for the main cooling water. A water filter 22 may be arranged upstream of the intermediate coolers 19, 20 in the main cooling water system. Furthermore, a metering device 25 for a protective agent (inhibitor) may be connected in parallel to the cooling water pumps 26, 27, said metering device being supplied with a suitable protective agent via an inlet 24. Moreover, the closed intermediate cooling circuit may be filled up with additional water via an inlet 28. Finally, the circuit also has to be connected to an equalizing tank 29. The individual plant parts are in each case equipped with valves which are illustrated in the figures by corresponding symbols, but, for the sake of simplicity, are not given reference marks.

Figure 6:
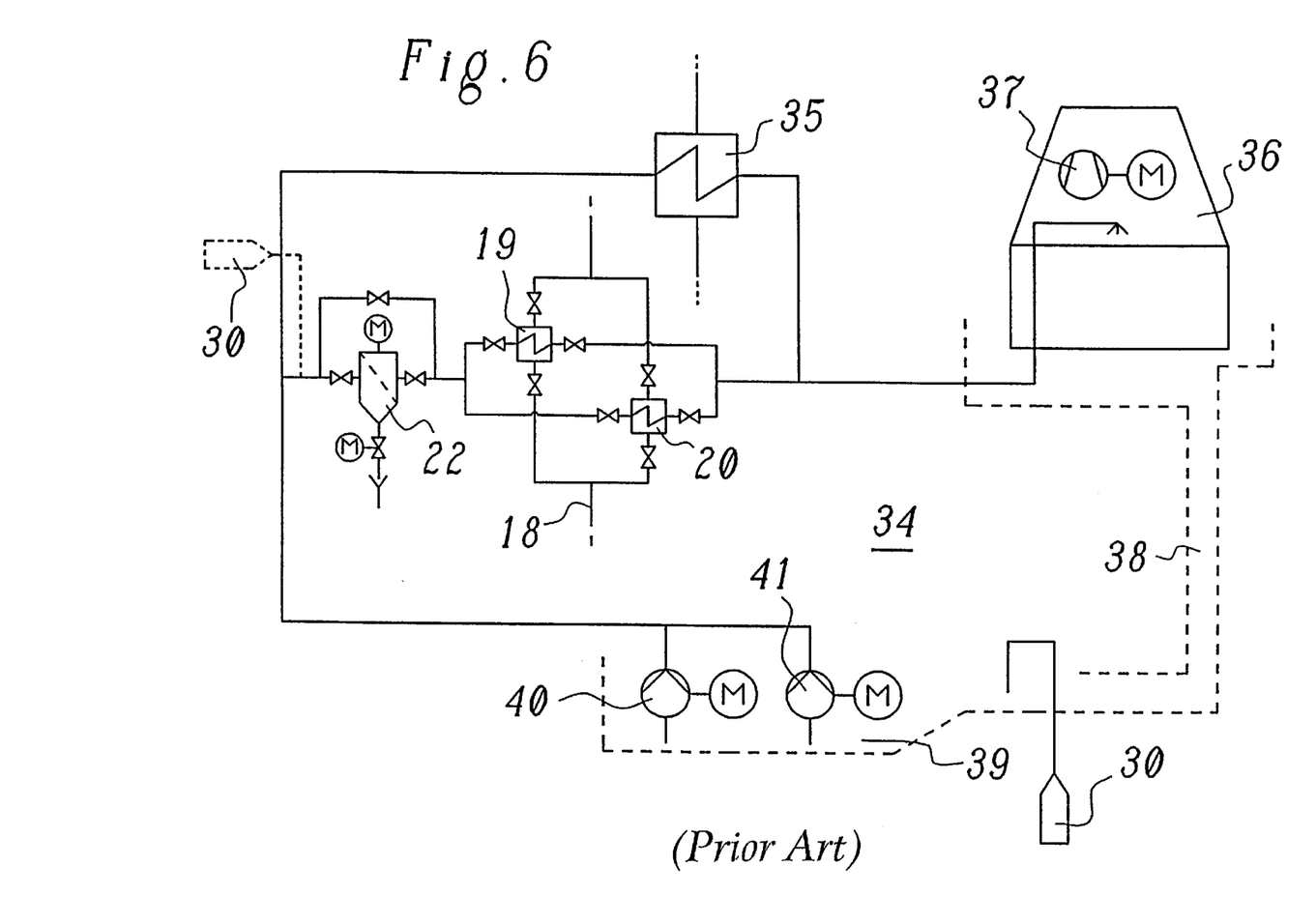
FIG. 6 shows the example of the linkage of the intermediate cooling circuit according to FIG. 1 to a main cooling water system with a cooling tower, said linkage being known per se.

An example of a suitable main cooling water system 34 is illustrated in FIG. 6. In this system, the intermediate coolers 19, 20 are arranged parallel to a main condenser 35 of the power station. The heated main cooling water is cooled in a cooling tower 36 which is equipped with a cooling tower fan 37, collects via a return 38 in a collecting pond 39 and is pumped back from there to the cooling points 19, 20 and 35 by means of two parallel main cooling water pumps 40, 41. The water evaporating in the cooling tower 36 is supplemented by means of an inlet 30 for additional cooling tower water. With regard to throughflow cooling, the cooling tower 36 may also be replaced by a water reservoir, for example a river, a lake or the ocean.

In the system according to FIGS. 1 and 6, the generator cooler 11 cools the cooling medium ($H_2$, air, water) used for cooling the generator. In this case, the temperature of the cooling medium can be influenced by the temperature of the heat sink (in the conventional case of the main cooling water), by the temperature difference ratings of the heat exchangers (coolers) used and by the mass flow conditions in the cooling circuits. Whereas, in the past, the performance of generators was more than adequate, as compared with plant output (for example, the gas turbines used), and high power reserves were available in the entire outside air temperature range (in the case of cooling tower cooling) or water temperature range (in the case of throughflow cooling), nowadays the cooling of generators is coming up against its limits on account of the rise in plant output, the increasing cost pressure, the limitation of the output of air-cooled generators to 300–350 MW at the present time, etc. However, in the case of smaller plants, too, or, for example, in the retrofit business, efficient generator cooling may assume critical importance.

Consequences arising from this situation would be:

a transition from air cooling to $H_2$ cooling that there would be a jump in power output and therefore cost restrictions in the power factor (cos φ)

that the prescribed insulation class would be overstepped by a few degrees (for example, B+5K)

a reduction in the life of the generator.

Another reason for improving generator cooling may also be, for example, an increase in the power output of an existing plant as a result of process improvements. This avoids the need for a generator replacement.

SUMMARY OF THE INVENTION

Accordingly, one object of the invention is to provide a novel generator cooling system which makes it possible, at little additional outlay, to increase the plant output without adverse consequences for the generator.

In a generator cooling system of the initially mentioned type, the object is achieved in that, in the intermediate cooling circuit, means are provided which improve the transmission of heat from the generator cooler into the main cooling water system. Owing to the improvement according to the invention in the heat discharge in the intermediate cooling circuit, plant output can be increased, without costly and complicated modifications having to be carried out on the generator itself or restrictions in the operation of the generator having to be accepted.

Heat discharge in the intermediate cooling circuit may optionally be improved either by connecting the coolers or cooling points differently in the intermediate circuit or by using different heat sinks or by combining a changed connection with a change in the heat sink.

A first preferred embodiment of the generator cooling system according to the invention is distinguished in that the generator cooler and the further coolers are connected in series in the intermediate cooling circuit, and in that the generator cooler is arranged between the at least one intermediate cooler and the further coolers. By virtue of this type of series connection, the medium of the intermediate cooling circuit, said medium being cooled in the intermediate cooler, first flows, undivided, through the generator cooler, thus leading to an increased mass flow and consequently markedly improving the heat discharge.

A preferred development of this embodiment is defined in that the main cooling water system is equipped with a cooling tower, and in that additional cooling tower water flows through the at least one intermediate cooler. If, for example, river water is used as additional cooling tower water, the temperature of the heat sink can thereby be lowered, as compared with the pure main cooling water, with the result that heat discharge is further improved.

A second preferred embodiment of the generator cooling system according to the invention is distinguished in that the main cooling water system is equipped with a cooling tower, and in that additional cooling tower water flows through the at least one intermediate cooler. If, for example, river water is used as additional cooling tower water, the temperature of the heat sink can thereby be lowered, as compared with pure main cooling water, with the result that heat discharge is improved, without the connection of the cooling points in the intermediate cooling circuit having to be changed.

A further preferred embodiment is defined in that an additional topping cooler, through which a cooling medium flows, is arranged upstream of the generator cooler in the intermediate cooling circuit. It is thereby possible, by means of a cooling medium having a temperature markedly below that of the main cooling water, to provide a heat sink of very low temperature which drastically improves heat discharge. In a development of this embodiment, if the main cooling water system is equipped with a cooling tower, the cooling medium can be additional cooling tower water. However, the cooling medium may also be cold water from a refrigerating plant. The cooling medium may, furthermore, be a cold brine solution, such as may occur in a chemical company. Finally, the cooling medium may be cold natural gas cooled by expansion.

Further embodiments emerge from the dependent claims.

BRIEF DESCRIPTION OF THE DRAWINGS

A more complete appreciation of the invention and many of the attendant advantages thereof will be readily obtained as the same becomes better understood by reference to the following detailed description, is when considered in connection with the accompanying drawings, wherein.

DESCRIPTION OF THE PREFERRED EMBODIMENTS

Referring now to the drawings, wherein like reference numerals designate identical or corresponding parts throughout the several views, it is possible, as was already mentioned initially, for air-cooled generators to have power output problems in power stations in which the main cooling water is fed through a cooling tower. These problems may arise at relatively high ambient temperatures, for example above 13° C. Whether power output problems arise also depends, however, on many other factors, such as, for example, on the type of plant, the climatic conditions (air humidity, etc.), the type of cooling system, etc. According to the invention, these problems are eliminated by improving the heat discharge in the intermediate cooling circuit of the generator cooling system. A first preferred exemplary embodiment of an improved cooling system according to the invention is illustrated in the circuit diagram in FIG. 2. The design of the generator cooling system is essentially identical to that illustrated in FIG. 1. Here too, the cooling medium of the closed intermediate cooling circuit 18 is fed through intermediate coolers 19, 20 which are connected to the main cooling water system via the main cooling water outlet 23. In contrast to the circuit shown in FIG. 1, however, here the main cooling water itself is not fed through the intermediate coolers 19, 20, but the additional cooling tower water via the inlet 30, said additional cooling tower water being required in order to replace the water losses of the main cooling water system as a result of evaporation in the cooling tower and blowdown. A corresponding change in the system of FIG. 6 would mean that, there, the inlet 30', represented by broken lines, is used for feeding the additional cooling tower water, instead of the inlet represented by unbroken lines, and the connection of the water filter 22 to the main cooling water system is dispensed with.

The international average values for the temperatures of main cooling water and additional cooling tower water or make-up (river water, town water, surface water) as a function of the outside temperature are represented by the following typical values:

| $T_{ambient}$ | Make-up | Main CW |
| --- | --- | --- |
| −15° C. | 5° C. | 15° C. |
| 15° C. | 15° C. | 23° C. |
| 35° C. | 24° C. | 33° C. |

Figure 2:
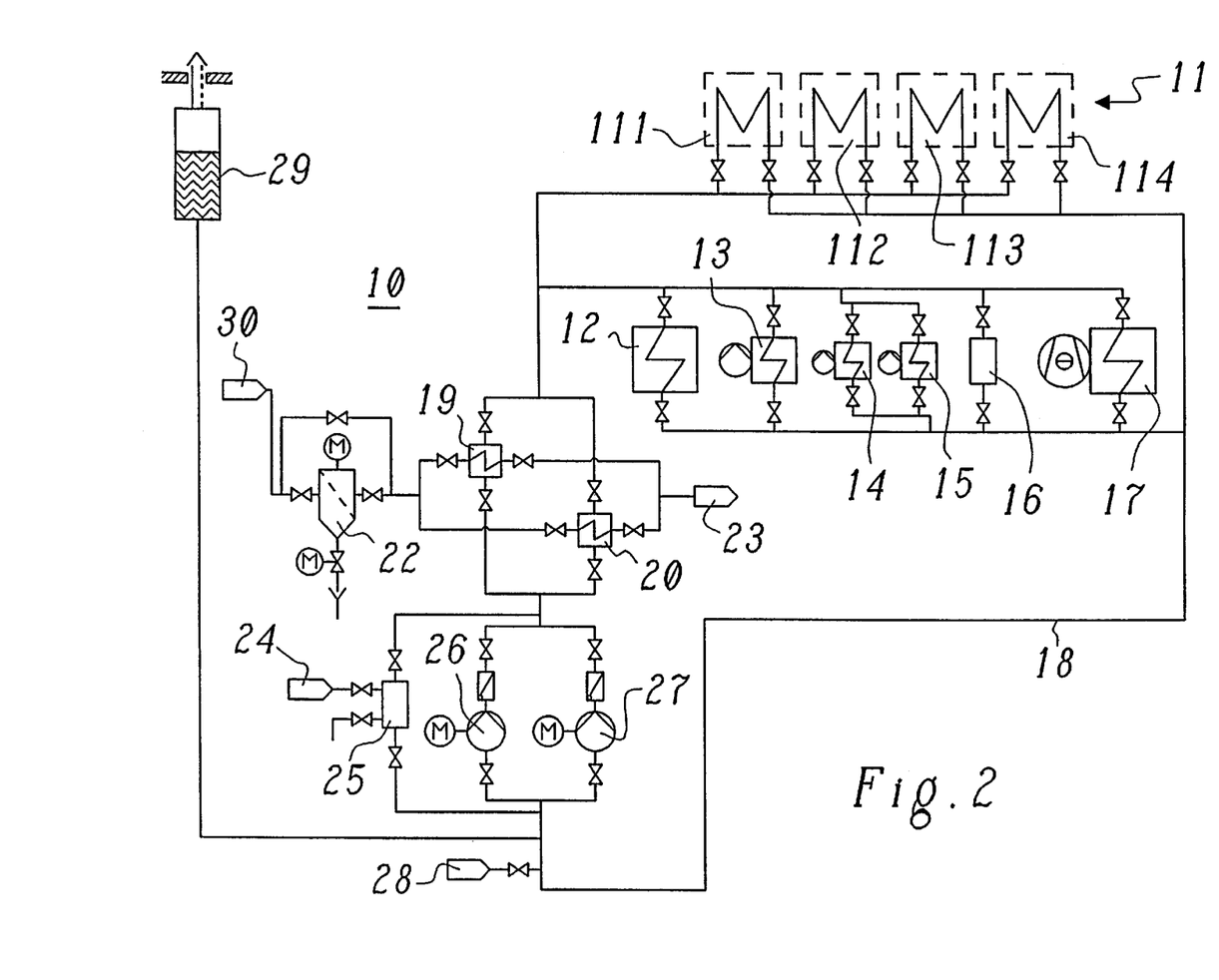
FIG. 2 shows the diagram, comparable to that of FIG. 1, of a first preferred exemplary embodiment of the invention with additional cooling tower water as a heat sink.

Since the additional cooling tower water (make-up) has a temperature well below that of the main cooling water at any outside temperature, the energy loss heat from the generator can therefore be discharged substantially more effectively via the intermediate coolers 19, 20, thus leading directly to an improved output of the generator.

EXAMPLE

A mass flow of 140 kg/s circulates in the closed intermediate cooling circuit 18 (through the intermediate coolers 19, 20), of said mass flow 71 kg/s flowing through the generator cooler 11 and 69 kg/s flowing through the remaining coolers 12, . . . , 17. In order, at an ambient temperature of 15° C., to discharge an energy loss of about 4000 kW in the generator cooler and an energy loss of about 3300 kW in the remaining coolers, in the case of a thickening of E=2 in the main cooling system, a mass flow of 112 kg/s consisting of river water is fed as additional cooling tower water through the intermediate coolers.

In this exemplary embodiment, in addition to the very low temperature level capable of being achieved by the additional cooling tower water, the following further advantages are afforded by removing the intermediate coolers 19, 20 from the circuit of the main cooling water system:

the cooling tower can be designed optimally in terms of cost with regard to the conditions in the main condenser the seasonal differences can be compensated the most effectively the intermediate coolers can be designed optimally without any restriction due to pressure losses it is possible for the closed intermediate cooling circuit to be operated independently of the main cooling water.

A problem in the example of FIG. 2 may be that the mass flow of the additional cooling tower water depends critically on the thickening in the cooling tower and therefore cannot be selected freely according to the cooling requirements in the intermediate coolers 19, 20. In order to overcome this problem, according to a further preferred exemplary embodiment of the invention, illustrated in FIG. 3, the intermediate coolers 19, 20 may be operated with a mixture of main cooling water (inlet 21) and additional cooling tower water (inlet 30). It is thereby possible, whilst at the same time having temperatures lower than that of the main cooling water, to vary the mass flows through the intermediate coolers 19, 20, as required, within particular limits. In this case, in the system of FIG. 6, once again the inlet 30', represented by broken lines, would be used for feeding the additional cooling tower water, instead of the inlet 30 represented by unbroken lines, without the connection between the water filter 22 and main cooling circuit being dispensed with.

EXAMPLE

Figure 3:
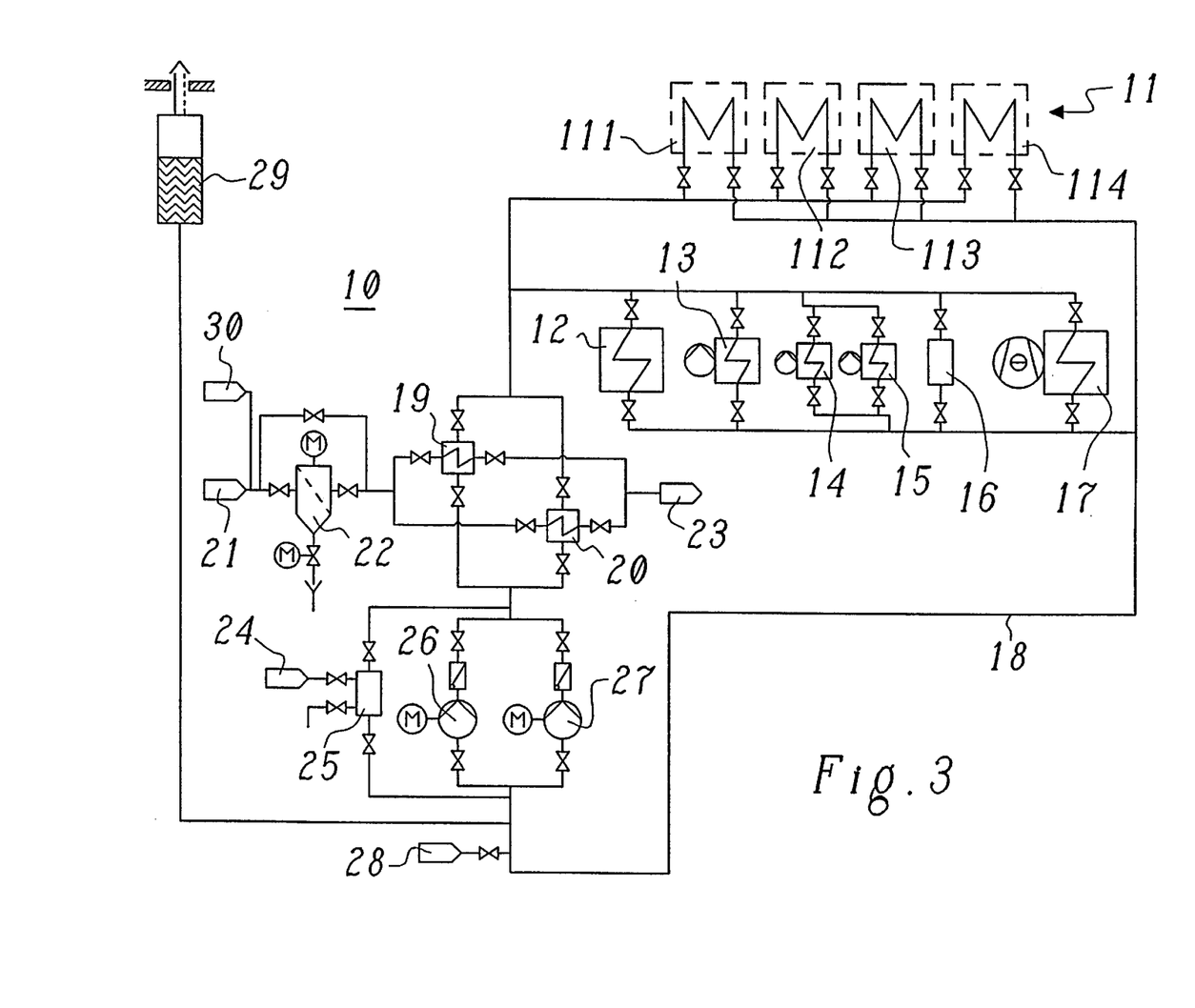
FIG. 3 shows the diagram, comparable to that of FIG. 1, of a second preferred exemplary embodiment of the invention with a mixture of additional cooling tower water and main cooling water as a heat sink.

Once again, a mass flow of 140 kg/s circulates in the closed intermediate cooling circuit 18 (through the intermediate coolers 19, 20), of said mass flow 71 kg/s flowing through the generator cooler 11 and 69 kg/s flowing through the remaining coolers 12, . . . , 17. In order, at an ambient temperature of 150° C., to discharge an energy loss of about 4000 kW in the generator cooler and an energy loss of about 330/kw in the remaining coolers, a mass flow of the cooling medium of 153 kg/s is fed through the intermediate coolers 19, 20, said mass flow being composed, in the case of a thickening of, for example, E=2, of 112 kg/s of additional cooling tower water and 41 kg/s of main cooling water or, in the case of a thickening of, for example, E=5, of 70 kg/s of additional cooling tower water and 83 kg/s of main cooling water.

Figure 4:
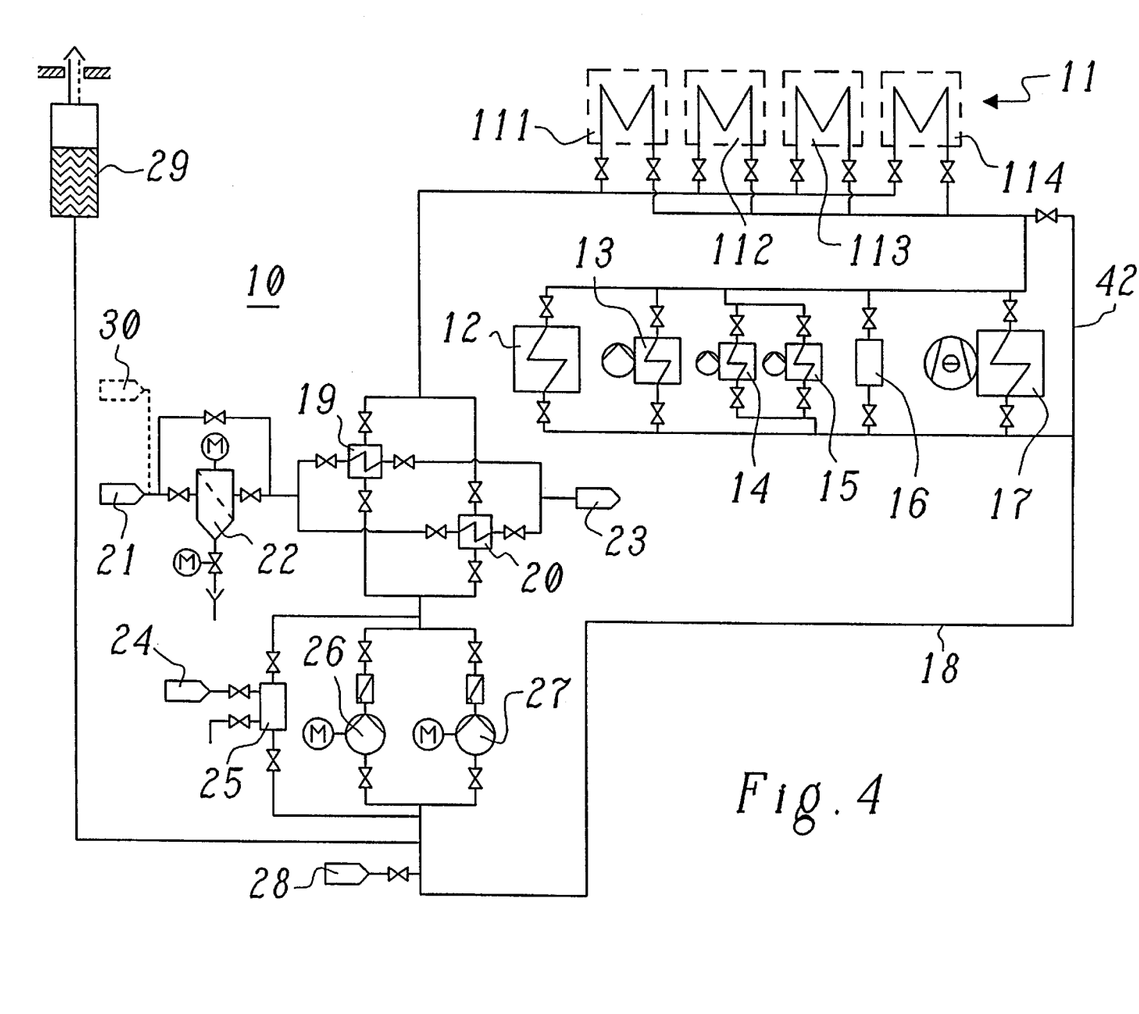
FIG. 4 shows the diagram, comparable to that of FIG. 1, of a third preferred exemplary embodiment of the invention with a series connection of the generator cooler and other cooling points.

According to the exemplary embodiment shown in FIG. 4, another possibility for improving the heat discharge is to change the connection of the cooling points or coolers 11 to 17 in the intermediate cooling circuit. It is particularly advantageous, in this case, if, according to FIG. 4, the generator cooler 11 and the further coolers 12, . . . , 17 are connected in series in the intermediate cooling circuit 18, and if the generator cooler 11 is arranged between the at least one intermediate cooler 19, 20 and the further coolers 12, . . . , 17. Since the cooling medium of the intermediate cooling circuit 18, said cooling medium being cooled in the intermediate coolers 19, 20, thereby first flows, undivided, through the generator cooler 11, an improved heat discharge is obtained. In addition, in order to bridge the parallel connection of the further coolers 12, . . . , 17, a bypass line 42 equipped with a valve may be provided, said bypass line ensuring that the generator cooler 11 operates independently of the other coolers 12, . . . , 17. So that the entire plant does not have to be shut down in the event of defective individual generator coolers 111, . . . , 114, but is kept in operation at reduced power, the individual coolers must in each case be capable of being bypassed individually. Of course, in the series connection of FIG. 4, the intermediate coolers 19, 20 can be operated, along with the corresponding advantages, not only solely with main cooling water (inlet 21), but also solely with additional cooling tower water (inlet 30 represented by broken lines) and also with a mixture of the two media (inlets 21 and 30).

Figure 5:
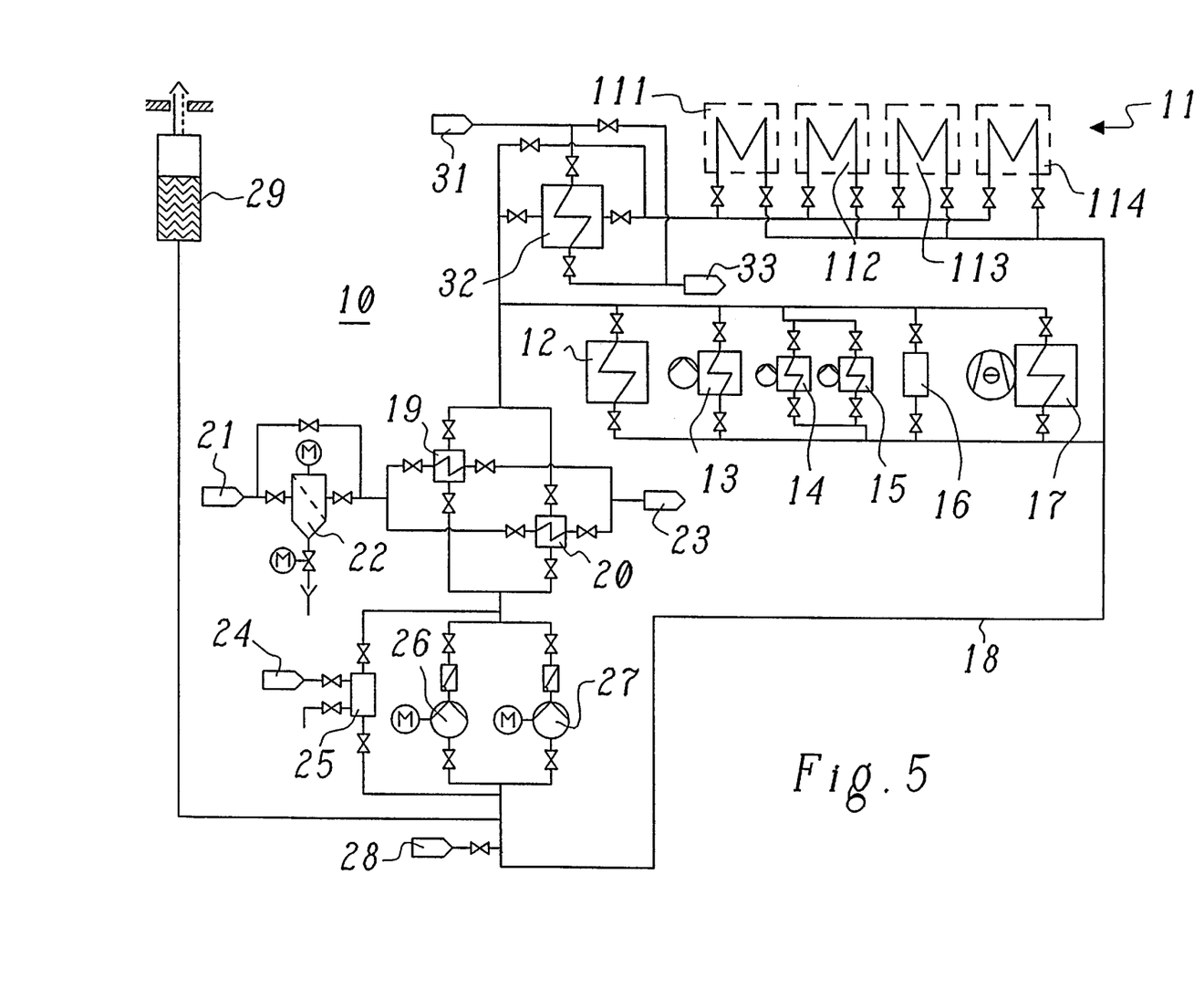
FIG. 5 shows the diagram, comparable to that of FIG. 1, of a fourth preferred exemplary embodiment of the invention with an additional topping cooler upstream of the generator cooler in the intermediate cooling circuit.

A further preferred exemplary embodiment of the generator cooling system according to the invention is illustrated in FIG. 5. In contrast to the previous exemplary embodiment of FIGS. 2 to 4, here an additional topping cooler 32 is arranged directly upstream of the generator cooler 11 in the closed intermediate cooling circuit 18, said topping cooler being operated with a separate cooling medium via an inlet 31 and an outlet 33. The separate topping cooler 32 results in the generator cooling being essentially independent of the remaining cooling points. In particular, the cooling medium may be freely selected, irrespective of the special needs of the remaining cooling system, and can be adapted optimally to the generator operating requirements. It is conceivable, in principle, to use the main cooling water itself as cooling medium for the topping cooler 32. The advantage, as compared with the circuit according to FIG. 1, is then that the topping cooler can be adapted specifically to the generator cooling requirements independently of the intermediate coolers 19, 20. If the main cooling water system 34 (FIG. 6) is equipped with a cooling tower 36, advantageously the additional cooling tower water, which is colder than the main cooling water, or a mixture of main cooling water and additional cooling tower water can be used as cooling medium. The discharge of generator energy loss heat can be made even more favorable if a cooling liquid which is even colder than the additional cooling tower water is also used as cooling medium. For example, a cold water (chiller water) which comes from a refrigerating plant may be employed for this purpose. Furthermore, it is also conceivable (precisely for a power station in a chemical company) to use as a cooling medium a cold brine solution, such as frequently occurs in such a company. Should natural gas at a higher pressure than that required be available, a reducing station should be used instead of a compressor to be cooled. Finally, therefore, it is also conceivable for the cooling medium to be cold natural gas which is cooled by expansion and is used, for example, for operating gas turbines in the power station.

EXAMPLE

A mass flow of 140 kg/s circulates through the intermediate cooling circuit 18, said mass flow once again being divided into 71 kg/s (generator cooler 11) and 69 kg/s (remaining coolers 12, . . . , 17). The cooling water in the circuit 18 has a temperature of about 35° C. when it enters the intermediate coolers 19, 20. The intermediate coolers 19, 20 have flowing through them the main cooling water at a mass flow of 140 kg/s and a temperature of 23° C. and cool the cooling water from approximately 35° C. to 27° C. 69 kg/s of the cooling water flow through the remaining coolers 12, ..., 17 and are heated there as a result of an energy loss of approximately 3300 kW to approximately 38° C. 71 kg/s flow through the topping cooler 32, are cooled there to approximately 19° C. by a mass flow of 71 kg/s of town water at a temperature of 8° C. and, finally, are heated in the generator cooler 11 to approximately 32° C. in the case of an energy loss of approximately 4000 kW.

It goes without saying that the use of one (or a plurality of) topping cooler(s) 32 can also be combined with changes to the intermediate coolers 19, 20, such as are illustrated in the examples of FIGS. 2 and 3.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method for optimizing the cooling efficiency of a generator cooling system for a generator used for electric power generation in a power station, said generator having a generator cooler which is arranged, together with further coolers, in a closed intermediate cooling circuit which transfers heat to a main cooling water system via at least one intermediate cooler, the method including providing means for increasing the mean driving temperature difference between the media flowing through the generator cooler in the intermediate cooling circuit to improve the transmission of heat from the generator cooler to the main cooling water system.

2. A generator cooling system for realizing the method as claimed in claim 1, wherein the generator cooler and the further coolers are arranged in serial flow connection in the intermediate cooling circuit, and wherein the generator cooler is arranged between the at least one intermediate cooler and the further coolers.

3. The generator cooling system as claimed in claim 2, wherein the main cooling water flows through the at least one intermediate cooler.

4. The generator cooling system as claimed in claim 2, wherein the main cooling water system is equipped with a cooling tower, and wherein additional cooling tower water flows through the at least one intermediate cooler prior to passing to the cooling tower.

5. A generator cooling system for realizing the method as claimed in claim 1, wherein the main cooling water system is equipped with a cooling tower, and wherein additional cooling tower water flows through the at least one intermediate cooler prior to passing to the cooling tower.

6. A generator cooling system for realizing the method as claimed in claim 1, wherein an additional topping cooler, through which a cooling medium flows, is arranged upstream of the generator cooler in the intermediate cooling circuit.

7. The generator cooler as claimed in claim 6, wherein the cooling medium is main cooling water.

8. The generator cooling system as claimed in claim 6, wherein the main cooling water system is equipped with a cooling tower, and wherein the cooling medium is additional cooling tower water.

9. The generator cooler as claimed in claim 6, wherein the cooling medium is cold water from a refrigerating plant.

10. The generator cooler as claimed in claim 6, wherein the cooling medium is a cold brine solution.

11. The generator cooler as claimed in claim 6, wherein the cooling medium is cold natural gas cooled by expansion.

12. The generator cooling system as claimed in claim 6, wherein main cooling water flows through the at least one intermediate cooler.

13. The generator cooling system as claimed in claim 8, wherein the main cooling water system is equipped with a cooling tower, and wherein additional cooling tower water flows through the at least one intermediate cooler prior to passing to the cooling tower.

14. The generator cooling system as claimed in claim 6, wherein the generator cooler and the further coolers are connected in parallel in the intermediate cooling circuit.

15. The generator cooling system as claimed in claim 6, wherein the generator cooler and the further coolers are connected in series in the intermediate cooling circuit, and wherein the generator cooler is arranged between the topping cooler and the further coolers.

16. A generator cooling system for a generator used for electric power generation in a power station, said generator having a generator cooler arranged, together with a plurality of further coolers, in a closed intermediate cooling circuit which transfers heat to a main cooling water system via at least one intermediate cooler, said system comprising means for increasing the mean temperature difference for driving heat transfer from the generator cooler to the main cooling water system, said means for increasing the mean temperature difference including at least one of:

a) said generator cooler and said plurality of further coolers being arranged in serial flow connection in the intermediate cooling circuit and the generator cooler being arranged between the at least one intermediate cooler and said plurality of further coolers;

b) said main cooling water system including a cooling tower, wherein additional cooling tower water flows through the at least one intermediate cooler prior to passing to the cooling tower; and c) an additional topping cooler, through which a cooling medium flows, is arranged upstream of the generator cooler in the intermediate cooling circuit.

17. The generator cooling system as claimed in claim 16, wherein the additional cooling tower water flows through the at least one intermediate cooler prior to flowing to the cooling tower, and main cooling water flows through the at least one intermediate cooler after having passed through the cooling tower.

18. A generator cooling system for a generator used for electric power generation in a power station, said generator having a generator cooler arranged, together with a plurality of further coolers, in a closed intermediate cooling circuit which transfers heat to a main cooling water system via at least one intermediate cooler, said system comprising means for increasing heat transfer from the generator cooler to the main cooling water system, said means for increasing the heat transfer including at least one of:

a) said generator cooler and said plurality of further coolers being arranged in serial flow connection in the intermediate cooling circuit and the generator cooler being arranged between the at least one intermediate cooler and said plurality of further coolers;

b) said main cooling water system including a cooling tower, wherein additional cooling tower water flows through the at least one intermediate cooler prior to passing to the cooling tower; and c) an additional topping cooler, through which a cooling medium flows, is arranged upstream of the generator cooler in the intermediate cooling circuit.

19. The generator cooling system as claimed in claim 18, wherein the additional cooling tower water flows through the at least one intermediate cooler prior to flowing to the cooling tower, and main cooling water flows through the at least one intermediate cooler after having passed through the cooling tower.

* * * * *